United States Patent [19]
Zenkner

[11] 3,942,264
[45] Mar. 9, 1976

[54] METHOD FOR THERMAL AFTERBURNING OF EXHAUST AIR FROM INDUSTRIAL WORKING PLANTS AND DEVICE FOR CARRYING OUT THIS METHOD

[76] Inventor: Kurt Zenkner, Hertzstrasse 10, Ettlingen, Germany

[22] Filed: Nov. 7, 1973

[21] Appl. No.: 413,595

[30] Foreign Application Priority Data
Nov. 9, 1972 Germany.................... 2254848

[52] U.S. Cl.............. 34/35; 432/72; 23/277 C; 34/86
[51] Int. Cl.².................. F26B 3/00; F26B 5/00
[58] Field of Search............... 34/26, 34, 35, 54, 79, 34/86, 72, DIG. 7; 432/14, 17, 29, 38, 39, 48, 49, 72, 222, 223; 23/288 F, 277 E; 165/36; 110/8 A; 431/5

[56] References Cited
UNITED STATES PATENTS

| | | | |
|---|---|---|---|
| 1,330,849 | 2/1920 | Davis | 432/48 |
| 2,704,062 | 3/1955 | Beyerman | 126/99 |
| 2,743,529 | 5/1956 | Hayes | 34/72 |
| 2,750,680 | 6/1956 | Houdry et al. | 34/36 |
| 2,779,573 | 1/1957 | Kuroda | 165/82 |
| 2,795,054 | 6/1957 | Bowen | 34/72 |
| 2,898,201 | 8/1959 | Hayes | 34/35 |
| 3,314,159 | 4/1967 | Betz | 34/72 |
| 3,437,321 | 8/1969 | Wilkinson | 432/72 |
| 3,604,824 | 9/1971 | Handison | 34/155 |
| 3,623,235 | 11/1971 | Smith, Jr. | 34/155 |
| 3,675,600 | 7/1972 | Jones | 110/8 A |
| 3,690,626 | 9/1972 | Vernazza | 432/29 |

*Primary Examiner*—John J. Camby
*Assistant Examiner*—Henry C. Yuen
*Attorney, Agent, or Firm*—Sherman & Shalloway

[57] ABSTRACT

In a plant in which there is a circulating gas flow, an afterburner is provided which is supplied with fuel from outside the system. A part of the circulating gas is extracted and fed to the afterburner after passing in heat exchange relation with a part of the burnt gas. The heat produced in the burner is fed to the plant either by feeding the burnt gas back to the plant or through heat exchange between the burnt gas and the gas in the plant.

13 Claims, 22 Drawing Figures

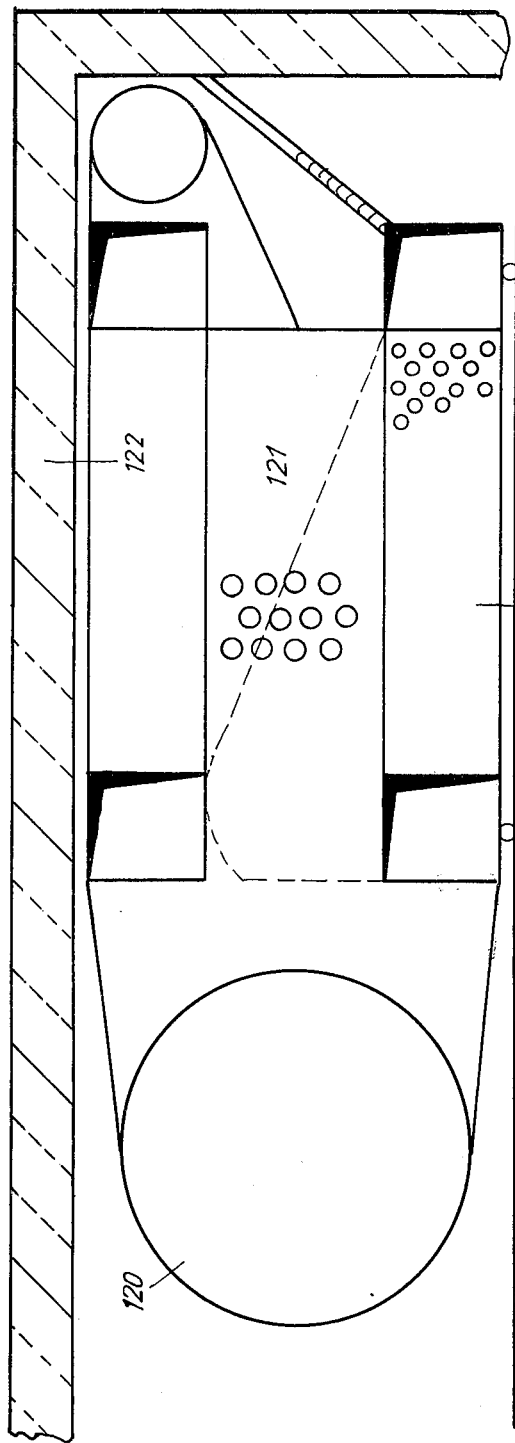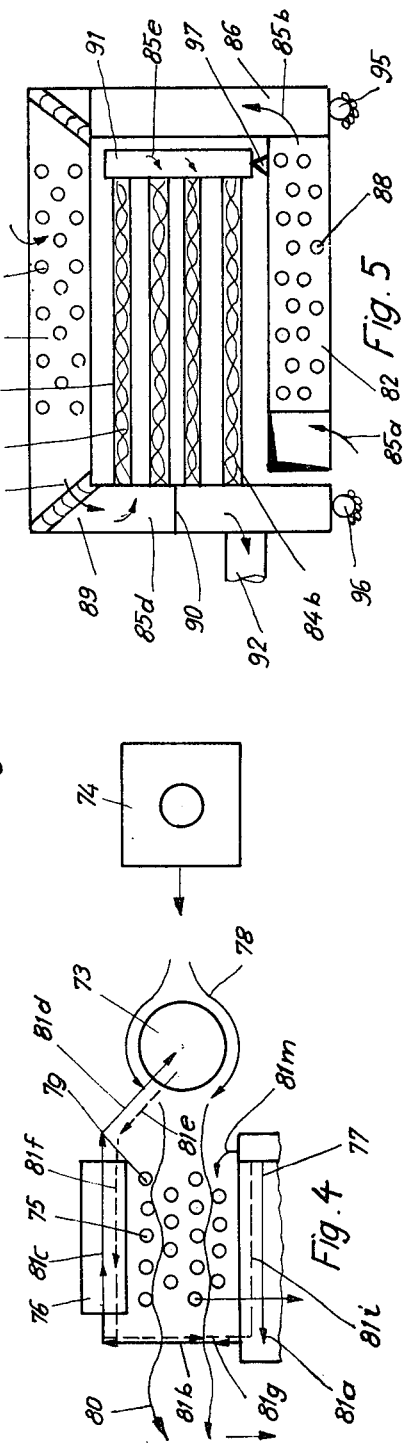

METHOD FOR THERMAL AFTERBURNING OF EXHAUST AIR FROM INDUSTRIAL WORKING PLANTS AND DEVICE FOR CARRYING OUT THIS METHOD

BACKGROUND OF THE INVENTION

Field of the Invention

The invention relates to a method and process for thermal afterburning of oxidisable foreign bodies or impurities, fluid particles or gas contained in exhaust air from industrial working plants, such as drying chambers, in which plants there is produced a circulating air circuit flow which contains hot air serving to perform the respective operation within the industrial plant and which leaves the industrial plant carrying foreign substances or impurities, fluid particles or gas therewith, in which method and process a part of the circulating air is extracted from the circulating air circuit flow in the form of exhaust air and is introduced into a thermal afterburning plant, in which afterburning plant the foreign matter, the impurities, fluid particles or gas contained in, and carried by, the exhaust air are burned by supplying them energy, for example, by means of a burner arrangement. The invention relates also to a device for carrying out this new process and method. Such devices are used, for example, in connection with drying chambers, baking ovens, tempering furnaces, roasting furnaces, destilling plants, printing plants etc.

When carrying out known process of the kind here above described there must be supplied very much additional energy to the industrial working plant as well as to the afterburning plant, moreover it is also necessary to insulate very effectively and, therefore, very expensively the parts standing under the influence of high temperatures, especially the parts constituting the combustion chamber and, generally, the burning chamber arrangement. It is the aim of the present invention to avoid the above disadvantages.

For the above purpose there are provided according to the invention with the new process the following steps: to supply energy from outside of the general (industrial working plant and thermal afterburning plant) only to the afterburning working plant, whereby the exhaust air to be cleaned may be preheated more or less intensively within a heat exchanger arrangement and is burned afterwards within a combustion chamber, and to introduce the heat energy resulting during the combustion into the circulating air circuit flow directly by means of the hot cleaned exhaust gases or indirectly by means of a heat exchanger. A device for carrying out the new process is characterized by the fact that the afterburning plant is situated — as seen in direction of flow — downstream from the industrial plant and that it contains on the one hand a heat exchanger arrangement and on the other hand a burning chamber arrangement through which the exhaust air coming from the industrial plant is caused to flow after passing the heat exchanger arrangement and the outlet of which stands in connection with the circulating air circuit flow of the industrial working plant, wherein conveniently a branch conduit deviates from this connection to the circulating air circuit flow in a direction towards the chimney and wherein a fresh air conduit opens into this connection. However, the arrangement may also be such as to have the device contain a burning chamber arrangement through which on the one hand the exhaust air — which leaves the industrial plant and the movement of which is assisted, for example, by means of a so-called circulating air blower — is caused to flow and which on the other hand is passed around and cooled by the circulating air, and such as to have allotted to the burning chamber arrangement two heat exchanger arrangements of which the one is situated as seen in the direction of the flow of the circulating air downstream from the burning chamber arrangement and is passed through by the circulating air, whereas the other one is arranged as seen in direction of flow of the exhaust air upstream from the burning chamber arrangement and is passed through on the one hand by the exhaust air and on the other hand by the exhaust gases leaving the burning chamber arrangement. The arrangement may be, for example, also such that to the circulating air circuit flow of the industrial working plant and to the exhaust air flow to be afterburned there is allotted a commom heat exchanger arrangement which on the one hand lies within the circulating air circuit flow and on the other hand is passed through by the exhaust air. The exhaust air flow is thereby preheated within the heat exchanger portion allotted thereto and afterwards it is supplied to the burning chamber arrangement in order to be afterburned. The afterburned cleaned exhaust gases flow in the opposite direction again through this heat exchanger portion while transmitting due to the high gradient heat to the just arriving exhaust air flow in order to be cooled down at the same time. After this precooling operation the exhaust gases enter the heat exchanger allotted to the circulating air in order to perform here the heating of the circulating air. For direct heat transmission a partial flow of cleaned hot exhaust gases is supplied after having passed a part of the heat exchanger either to the burning chamber arrangement or directly to the circulating air. The remaining part of the flow reaches the chimney again under heat transmission through the heat exchanger.

The arrangement according to the invention distinguishes by the fact that substantially less energy is required since it is not necessary to supply energy on the one hand to the industrial plant and on the other hand to the afterburning working plant. The insulation may be simpler and less expensive, the parts of sheet metal are cooled by the circulating air so that material of lower and, therefore, less expensive quality may be used, whereby at the same time a higher service life and higher strength may be obtained. It is now possible to perform energy saving regulation operations under the highest burning chamber temperature since only a small amount of energy is transmitted to the circulating air in an uncontrollable manner and an exact regulation of the heat delivery and heat transmission within the heat exchanging arrangements is now possible. Generally speaking, the arrangement according to the invention is compact and requires less space, it is possible to build up a so-called compact unit which may contain the blower for the circulating air (conveniently a transverse flow blower), the burning chamber arrangement and the different heat exchanger arrangements, and also the different bypass arrangements, the blower for the exhaust air (for example, a transverse flow blower, too), etc.

Several embodiments of the invention will now be described, by way of example with reference to the accompanying drawings, in which:

FIGS. 4 and 5 show schematically a further variant of the device according to the invention in a side view, and in a front view.

FIG. 9 is a side view of another modified embodiment of the invention,

Figure 1:
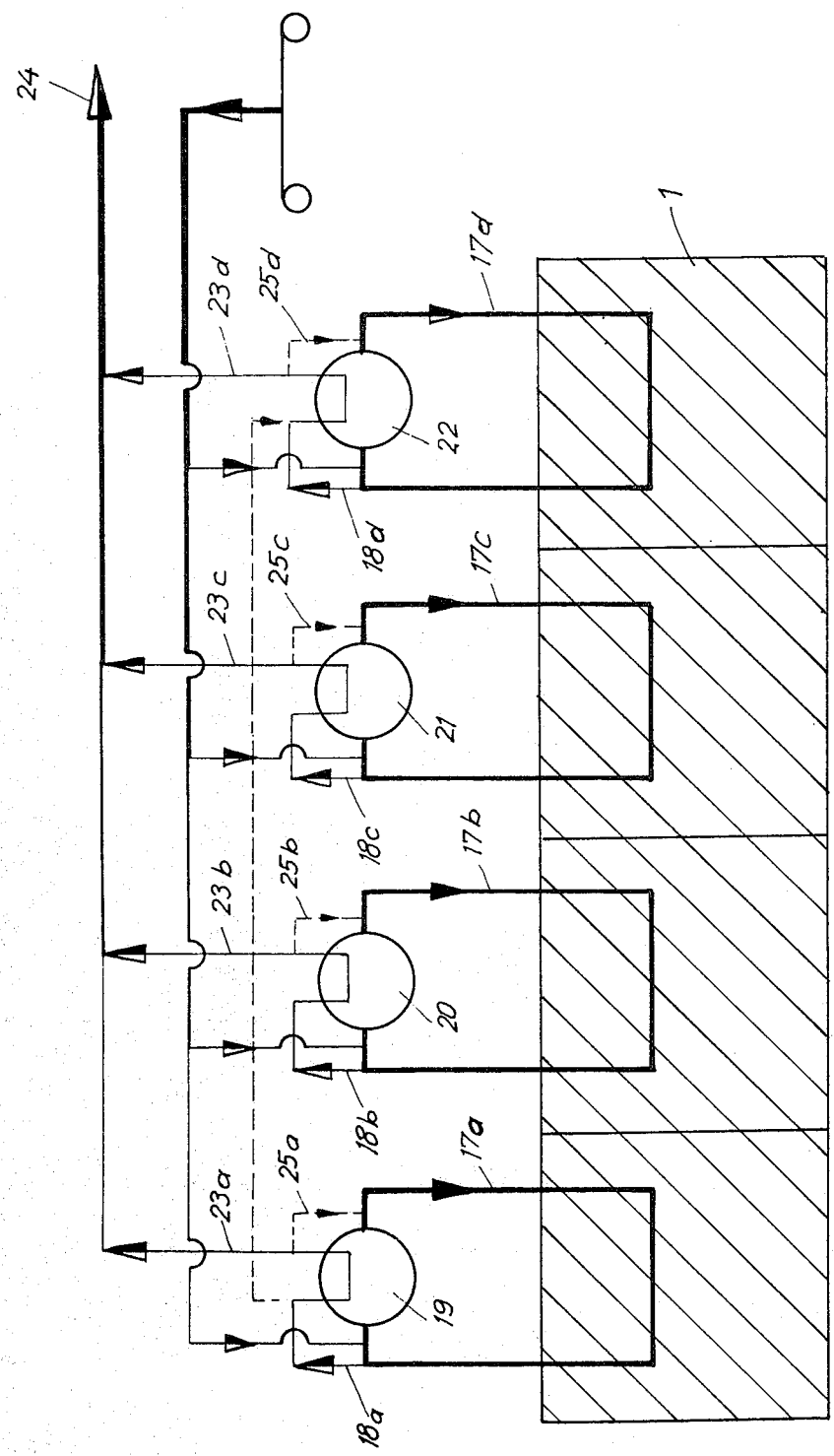
FIG. 1 is a diagram of a plant according to the invention which operates according to the new method.

The invention helps to avoid the above enumerated drawbacks of the known arrangements by proposing to supply energy from outside the whole system containing the afterburning plant and the industrial working plant substantially only within the afterburning arrangement and to introduce the hot exhaust gases resulting during combustion within the afterburning plant into the industrial working plant and/or to supply these exhaust gases to the circulating air circuit flow already existent in this industrial working plant in order to transmit the energy necessary for performing the desired work to the air circulating within the circulating air circuit flow, wherein in this case the exhaust air is again introduced in known manner into the afterburning plant. Therefore, whereas with the known methods and processes of the kind in question the exhaust gases leaving the afterburning plant enter directly the chimney, with the process according to the invention at least a part of the exhaust gases is introduced into the industrial working plant and supplied or added to the circulating air circuit flow already existent therewithin in order to impart to the air already existent in the circulating air circuit flow the energy necessary for performing the work required. With the arrangement according to FIG. 1 to the circulating air circuit flow 17a, 17b, 17c, 17d within the industrial working plant and to the exhaust air flow 18a, 18b, 18c, 18d to be afterburned — which exhaust air flow is branched off the circulating air circuit flow — there is allotted, respectively, a common air heating arrangement 19, 20, 21, 22 which is contained on the one hand in the circulating air circuit flow 17a, etc. and through which flows on the other hand the exhaust air according to the arrow 18a etc., so that each heating arrangement is common to a circulating air flow circuit and to an exhaust air flow circuit. Thereby, a part of the exhaust gas leaving the air heating arrangement according to the arrows 23a, 23b, 23c, 23d issues through the chimney at 24, whereas another portion is returned into the circulating air circuit flow according to the arrows 25a, 25b, 25c, 25d. The appliances 19, 20, 21, 22 have, therefore, two tasks to fulfill, namely to heat up the air in the circulating air circuit flow on the one hand and to clean on the other hand the exhaust air by combustion. The energy released during the afterburning operation is, therefore, not directly delivered into the chimney, but it is supplied to the circulating air. Therefore, a substantial saving of energy is obtained.

Figure 2:
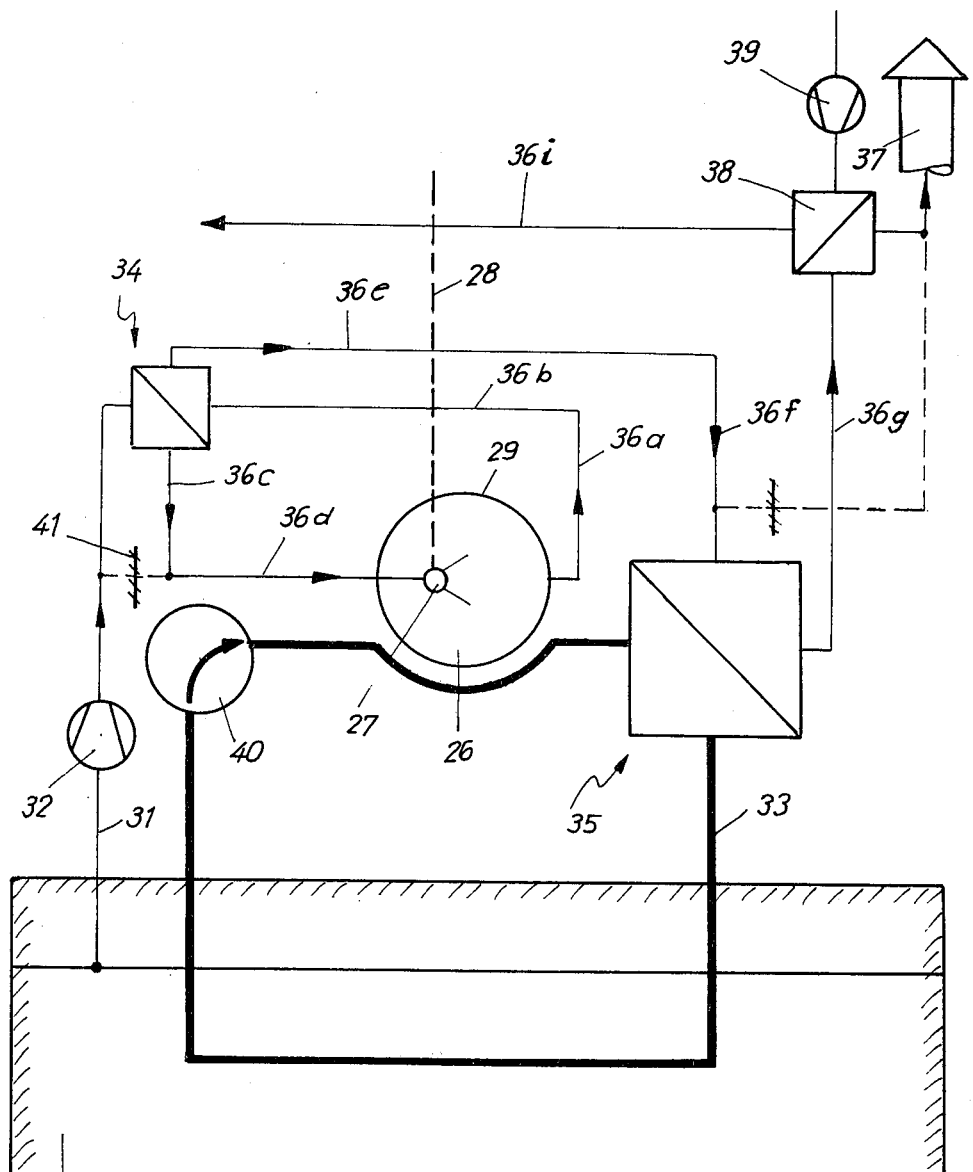
FIGS. 2 and 3 are further embodiments of devices according to the invention each shown in a schematical representation.
Figure 3:
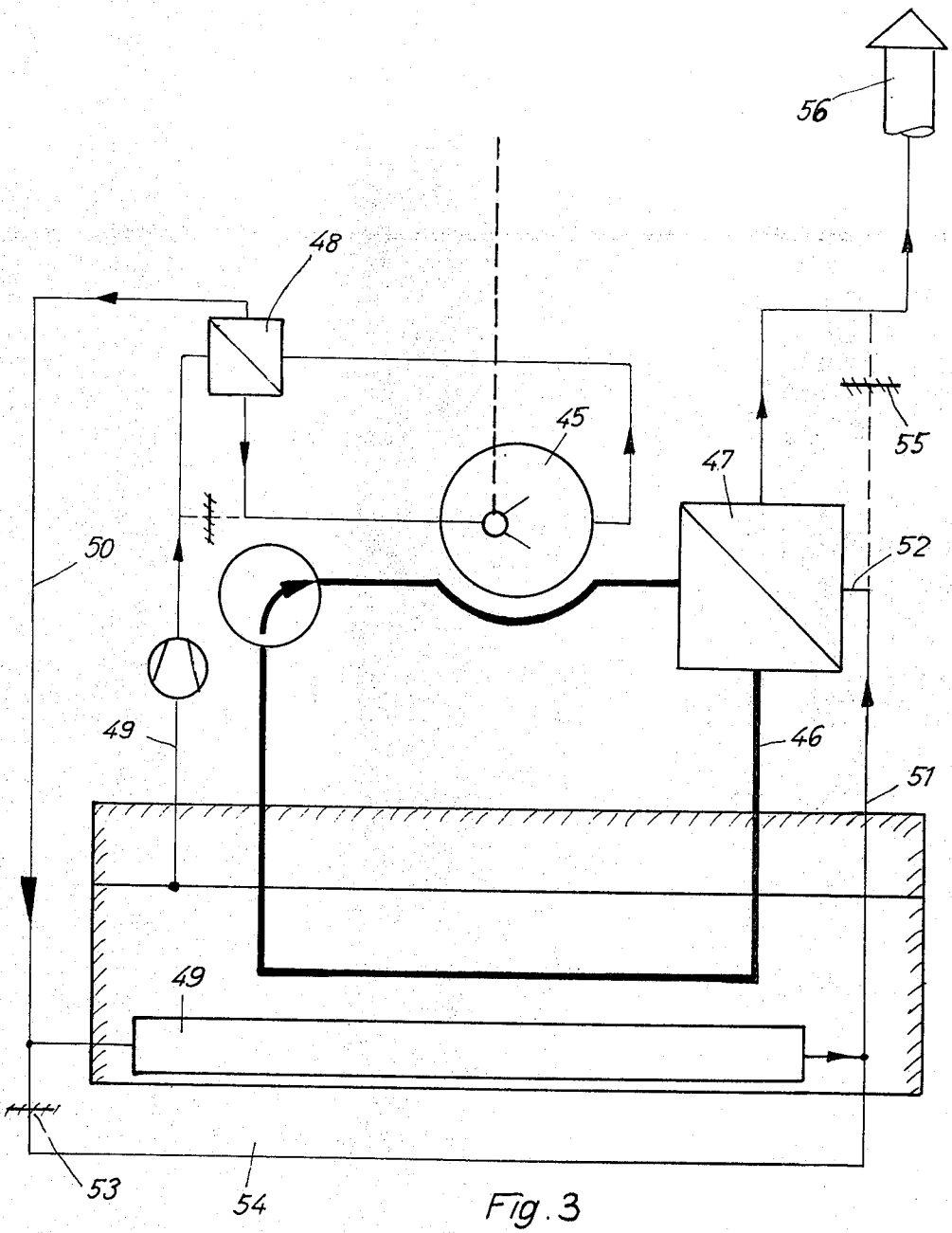

FIG. 2 shows an embodiment of the device according to the invention as used for carrying out the new process, wherein the details shown there bring about further important advantages. The new device contains a burning chamber arrangement 26 consisting of a burner 27 to which auxiliary energy from the outside is supplied at 28 and a combustion chamber 29. Through this burning chamber arrangement 26 there flows on the one hand the exhaust air 31 coming from the industrial working plant 30, the flow of which is assisted by the blower 32, and on the other hand the circulating air circuit flow 33 flows round the above burning chamber arrangement. With this arrangement 26 there are associated two heat exchanger arrangements, 34, 35 of which the one is arranged as seen in the direction of flow of the circulating air circuit 33 downstream from the burning chamber arrangement 26 ("first heat exchanger arrangement"). The heat exchanger arrangement 34 is situated as seen in the direction of flow of the exhaust air 31 before the burning chamber arrangement ("second heat exchanger arrangement"). Through this second heat exchanger arrangement there flow on the one hand the exhaust air 31 and on the other hand the exhaust gases 36a, 36b issuing from the burning chamber arrangement. The exhaust air flows through the heat exchanger arrangement 34 and then enters according to the arrows 36c, 36d into the burning chamber arrangement, the exhaust gases heat the exhaust air within the heat exchanger arrangement 34 and then flow after leaving this heat exchanger arrangement 34 according to the arrows 36e, 36f into the first heat exchanger arrangement 35 within which they heat the air in the circulating air circuit flow 33 in order to then leave this heat exchanger arrangement according to arrow 36g and to flow in direction towards the chimney 37. With this arrangement according to FIG. 2 there is provided also a third heat exchanger arrangement 38 which is situated as seen in the direction of the flow of the exhaust gases downstream from the first heat exchanger arrangement and within which the exhaust gases preheat the fresh air arriving according to the arrows 36i. This fresh air can be conveyed, for example, by means of the blower 39. It is possible to introduce fresh air from this fresh air supply line via a branch line directly and on the shortest way into the circulating air circuit flow, for example, in the case in which there must be guaranteed a minimal content of oxigen, such as with lacquer or varnish drying plants. In the circulating air circuit flow there is contained a conveying blower 40, whereas the flow of the exhaust air directed outwardly of the industrial working plant is assisted by the blower 32, for example, a suction blower which produces within the industrial working plant an underpressure (the underpressure necessary in such plants) and which at the same time serves to overcome and compensate the loss of pressure in the burning chamber arrangement and in the heat exchanger arrangement. With other embodiments of the invention to be described later it is provided that the second heat exchanger arrangement is also cooled by the circulating air circuit flow flowing therearound. The arrangement is, therefore, such that the exhaust air flow, the exhaust gas flow and the circulating air circuit flow constitute outside the industrial working plant circuits entirely seperated from one another and that these flows pass along one another only in the areas of the burning chamber arrangement and of the first and second heat exchanger arrangement, respectively. Additionally, there is provided also a bypass arrangement 41 contained within the exhaust air flow and serving for regulating the transport of heat to the circulating air by maintaining constant combustion chamber temperature. This bypass arrangement 41 associated with the second heat exchanger arrangement 34 has the purpose to direct — if desired and necessary — the flow of exhaust air coming from the industrial working plant wholly or partially passed the second heat exchanger arrangement and to supply it directly to the burning chamber arrangement. In the case in which the second heat exchanger arrangement 34 is by-passed (so that it is not passed through by the exhaust air) much energy is required if a certain combustion chamber temperature must be obtained and maintained, since in this case the exhaust air enters into the burning chamber arrangement in a relatively cold state so that much auxiliary energy must be supplied within the combustion chamber. However, the exhaust gas flowing according to the arrows 36a, 36b cannot be cooled down in this case within the heat exchanger arrangement 34, it thereby reaches the first heat exchanger arrangement 35 in a hotter state so that more energy is imparted to the circulating air. In the case in which the bypass arrangement is closed and through the second heat exchanger arrangement 34 there flows the whole exhaust gas flow, the issuing exhaust gases are less hot, they impart less energy to the circulating air in the heat exchanger arrangement 35. The heat exchanger arrangement 34, must, therefore, be so designed that with a closed by-pass arrangement the amount of energy which is released within the combustion chamber by the combustion just corresponds to the minimum energy required by the circulating air. In this manner there is possible a regulation within a broad area with constant combustion chamber temperature i.e., when the quality of the combustion products is constant, whereby the amount of energy transmitted to the circulating air circuit flow by the exhaust gas flow can be regulated within a wide area. With this arrangement the whole energy required in the industrial working plant is released in the afterburning plant, wherein conveniently the heat exchanger allotted to the afterburning operation (second head exchanger arrangement) is designed correspondingly to the minimum amount of heat required by the heat exchanger allotted to the circulating air (first heat exchanger arrangements). From all these considerations it results that it is necessary to tend to deliver in the area of the combustion chamber as little energy as possible, wherefore it is preferable to line the interior of the combustion chamber of the burning chamber arrangement with a ceramic mass which diminishes the heat transfer and prevents too much energy from being delivered to the surface of the combustion chamber. Furthermore, it is convenient to so design the heat exchanger allotted to the circulating air that it reacts very sensitively. It must possess as small a mass as possible and it must be provided with turbulence producing elements in order that the circulating air be rapidly influenced by what takes place in that area. Conveniently, the heat exchanger of the second heat exchanger arrangement 34, too, is provided with turbulence producing elements. The combustion chamber arrangement and the different heat exchanger arrangements are contained in a housing insulated with respect to the outside, for which reason the insulation may be less heavy and less expensive since it is only necessary to insulate between the level of the temperature of the circulating air, which may be, for example, 200°, and the temperature level of the surrounding atmosphere and not between a temperature of 750° to 800° and the surrounding atmosphere. The arrangement according to FIG. 3 corresponds to that of FIG. 2 and contains a burning chamber arrangement 45, the circulating air circuit flow 46, the first heat exchanger arrangement 47, the second heat exchanger arrangement 48 etc. Additionally, there is provided as seen in the direction of the exhaust air flow 49 downstream from the second heat exchanger arrangement 48 a radiator arrangement 49, for example, in the form of a radiator pocket, arranged preferably within the industrial working plant, which radiator arrangement is connected on its inlet side with the second heat exchanger arrangement for taking over the exhaust gases issuing therefrom according to arrow 50 and is further connected on its outlet side with the first heat exchanger arrangement 46 according to arrows 51, 52. To the radiator arrangement there can be allotted also, for example, a by-pass arrangement 53 with the aid of which the exhaust gases coming from the second heat exchanger arrangement according to arrow 50 may be caused to flow past the radiator arrangement — and not therethrough — and to flow directly via the by-pass conduit 54 to the first heat exchanger arrangement, whereas to the outlet of the radiator arrangement or the by-pass conduit there may be allotted a further by-pass arrangement 55 with the aid of which the exhaust gas coming from the radiator arrangement or flowing in the by-pass conduit are caused to flow past the first heat exchanger arrangement 47 in a direction towards the chimney 56. The radiator pocket is situated within the industrial working plant and serves also to assist the operation of the industrial working plant and to further supply energy at this place. In this case there result further possibilities for regulating the heat transfer. The second heat exchanger arrangement may be constituted of two individual heat exchangers which are connected in series one behind the other as seen in the direction of the exhaust air flow coming from the industrial working plant as well as in the direction of the exhaust gas flow coming from the burning chamber arrangement. Thereby, in the case of the exhaust air flow, the first one of the two individual heat exchangers is first in the flow direction, whereas in the case of the exhaust gas flow the second of the two individual heat exchangers is first in the flow direction. With the aid of the by-pass arrangements the individual heat exchangers may be put into operation either individually and separatedly or jointly and unitedly.

Figure 6:
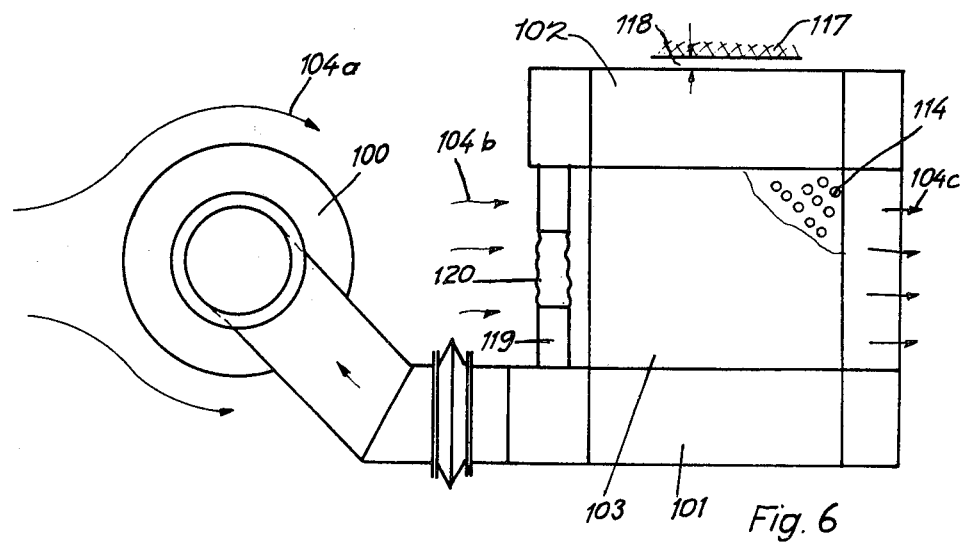
FIG. 6 is another modified embodiment of the invention in a side view.
Figure 7:
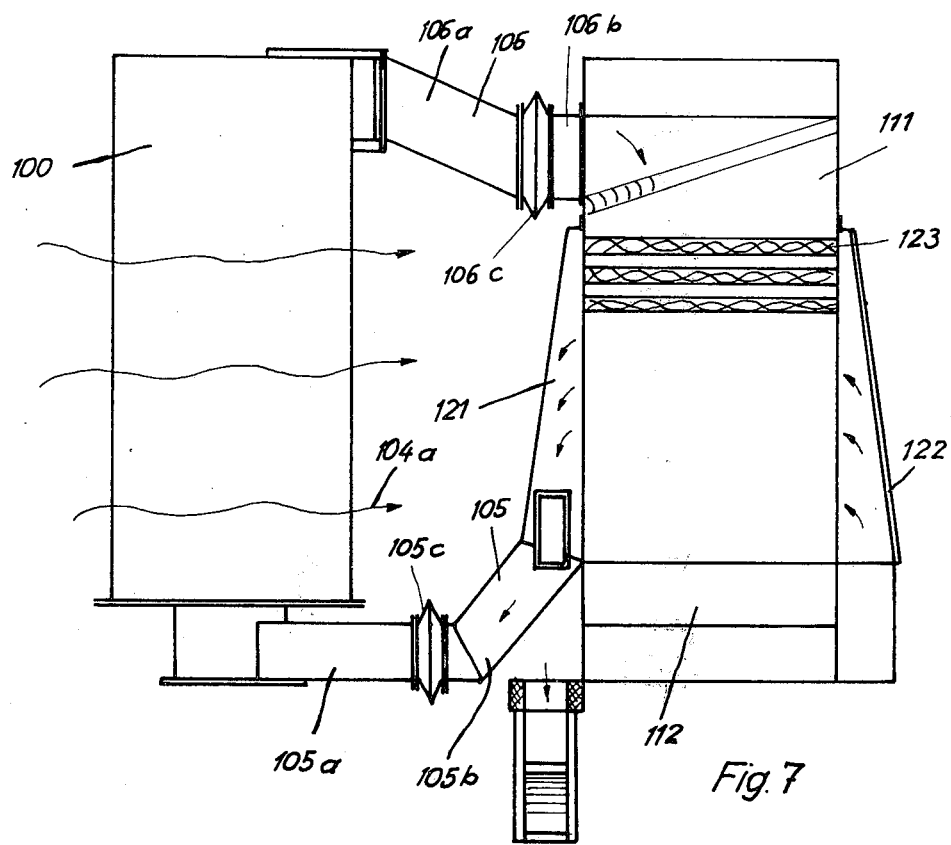
FIG. 7 is a plan view of the device according to FIG. 6.
Figure 8:
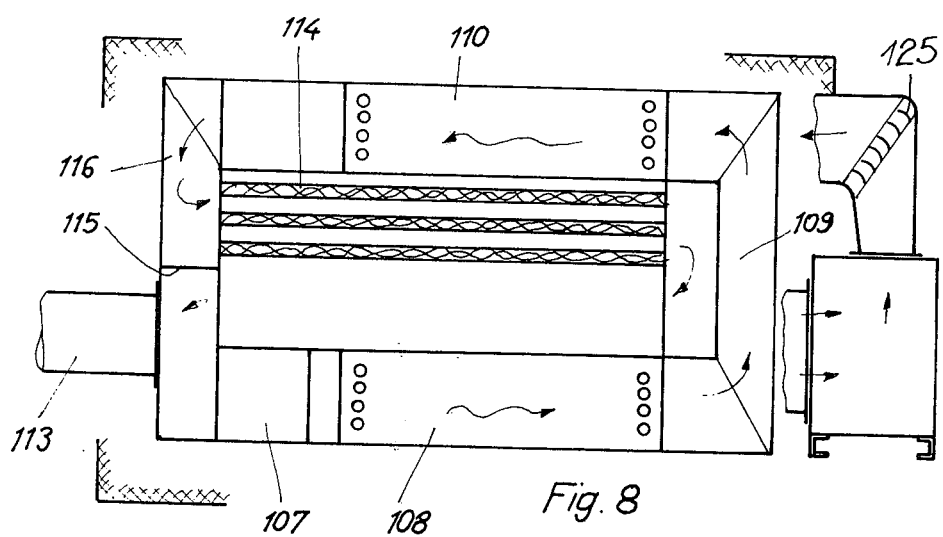
FIG. 8 is a front view of the device according to FIG. 6.

In FIG. 4 there is schematically shown the mode of operation of a further embodiment of the invention. The combustion chamber is shown at 73; 74 is the blower for conveying the circulating air, 75 is the first heat exchanger arrangement, whereas 76 and 77 are two individual heat exchangers which constitute together the seconde heat exchanger arrangement. The circulating air is blown by means of the conveying blower 74 constructed as a transverse flow blower around the combustion chamber arrangement 73 according to the arrows 78 so that the circulating air flows round the burning chamber arrangement over its whole periphery, and then the circulating air is blown between the pipes or tubes 79 of the first heat exchanger arrangement 77 according to the arrows 80 in order to enter from here the industrial working plant not further shown here. The exhaust air flows from the industrial working plant into the second heat exchanger arrangement within which it is guided along the arrows 81a, 81b and 81c, then it flows in preheated state according to arrow 81d into the burning chamber arrangement 73 in which it is burnt. The exhaust gas thereby produced is passed according to the arrows 81e, 81f, 81g and 81i finally through the second heat exchanger arrangement in order to thereby preheat the exhaust air just arriving from the industrial working plant, for example, in counter-current or in cross-current. Subsequently, the exhaust gas is introduced into the tubing 79 of the first heat exchanger arrangement according to the arrows 81m in order to enter thereupon into the chimney. It has proved to be convenient to construct the impeller wheel of the transversal flow blower as a longish drum or cylinder the length of which corresponds approximately to that of the conveniently cylindrical combustion chamber 73, whereby the combustion chamber and the impeller wheel extend approximately in parallel relationship. It is provided in this case to have the second heat exchanger arrangement constituted of two interconnected portions or halves 76, 77 which are arranged parallel to one another and in interspaced relationship and which enclose between them the first heat exchanger arrangement. In this case, too, the second heat exchanger arrangement is assembled with the two individual heat exchangers of the first heat exchanger arrangement (which enclose between them the second heat exchanger arrangement) to form a compact unit having the shape of an elongated flat prism with a cross section of, for example, rectangular shape, within which compact unit there extend cross channels and distributing channels connecting the two individual heat exchangers of the second heat exchanger arrangement. The prism and the combustion chamber which extends conveniently in parallel and interspaced relationship and which may have, for example — the shape of a circular cylinder are interconnected by connecting channels which open on the one hand into the combustion chamber on the two axial ends thereof and which on the other hand constitute the connection to the cross channels and individual heat exchangers. An embodiment of the principle indicated in FIG. 4 is shown in FIG. 5, in which the two individual heat exchangers of the second heat exchanger arrangement are shown at 82, 83, whereas the first heat exchanger arrangement is shown at 84. The exhaust air arrives according to arrows 85a and flows through the first individual heat exchanger 82 in order to then enter the channel 86 according to arrow 85b. After having subsequently passed through the second individual heat exchanger 83, the exhaust air reaches the combustion chamber, the exhaust gases issuing therefrom enter the tubing 87, 88 of the two individual heat exchangers from where they flow according to arrows 85c, 85d into the tubing 84a of the first heat exchanger arrangement. The last connecting channel running in vertical direction from top to bottom is separated approximately in its midst by a partition wall 90 into two halves associated respectively with the half of the tubes of the first heat exchanger arrangement which open at their other end into a final connecting channel. Thereby, the air entering according to the arrows 85c, 85d into the tubes 84a flows within collecting channel 91 according to arrows 85 downwards in order to then flow within the tubing 84a of the first heat exchanger arrangement in the opposite direction and again within channel 89, however, in this case in such a manner as to enter into its lower half, whereupon the air may issue through tube 92. In this case, the heat exchangers may consist conveniently of an assembly of tubes containing turbulence producing elements 93, these heat exchangers being passed through by the air and the gas according to the counter-current or cross-current principle. It is further to be seen that the different heat exchangers 82, 83 and distributing and cross channels 86, 89 and 84, 91 are arranged with respect to one another so as to form together a volute-like shaped structure or body, wherein the warmer parts, especially the parts of the second heat exchanger arrangement, are situated towards the exterior and the cooler parts, especially the parts of the first heat exchanger arrangement are situated towards the interior. Conveniently, the arrangement is such that the different vertical connecting channels are situated on the two front sides of the housing and are mounted or supported on the base movably or elastically, for example, by means of so-called safety rolls 95, 96 or by means of ball supports or mountings, whereas the horizontal connecting and distributing channels extend at the top and the bottom along the longitudinal sides of the housing. The two individual heat exchangers of the second heat exchanger arrangement are constructed as superposed horizontal boxes in the shape of parallel flat prisms, wherein the upper one is supported from below by the vertical connecting channels 86, 89, whereas the lower one is connected only at its one end with its front side to one of the vertical channels, its other end being free to move. Due to this fact and due also to the fact that between the exterior vertical channel 91 of the first heat exchanger arrangement which is movably mounted with its lower end on the base at 97, and the vertical connecting channel 86 of the second heat exchanger arrangement there is provided an interspace, an especially good elasticity and ability to move of the entire plant or arrangement is obtained which can now undergo also high thermal stresses without suffering distortions. Constructional details of the above explained principle are shown in FIGS. 6 to 8. The combustion chamber is designated by 100, 101 and 102 are the individual heat exchangers of the second heat exchanger arrangement, 103 is the first heat exchanger arrangement. It can be seen that the circulating air flows according to arrows 104a, 104b, 104c around the combustion chamber and then flow through the first heat exchanger arrangement between the two individual heat exchangers of the second heat exchanger arrangement. 105 is the collecting channel through which the exhaust air arrives into the burning chamber arrangement after having left the second heat axchanger arrangement, 106 is the channel through which the exhaust gas flows from the burning chamber arrangement into the second heat exchanger arrangement. The exhaust air flows through the channel 107 into the lower individual heat exchanger 108 in order to then flow upwards via the vertical channel 109, whereupon the exhaust air flows through the upper individual heat exchanger 110 in order to enter into the combustion chamber via the collecting channel 105. The exhaust gas flows via the channel 106 into the cross distributing channel 101, whereupon it flows first through the upper individual heat exchanger 110 in opposite direction and then via the vertical channel 112 downwards, then it flows through the first individual heat exchanger in opposite direction until it can leave via the connecting branch 113, for example, towards the chimney. Therefore, the exhaust air is passed via a distributing channel through one of the individual heat exchangers of the first heat exchanger arrangement and then, after having passed through a vertical connecting channel, through the other individual heat exchanger, in order to be subsequently introduced via the collecting channel into the combustion chamber from which the exhaust gas is passed via a cross distributing channel to one of the individual heat exchangers of the second heat exchanger arrangement and from there via another distributing channel through the other individual heat exchanger in order to be then passed via a last connecting channel through the tubes of the first heat exchanger arrangement which are passed around from the outside by the circulating air after this latter has passed the combustion chamber and passed therearound. These tubes are shown at 114. In this case also there is provided a horizontal partition wall 115 in the middle area of the vertical channel 116, in this case, too, the exhaust gas flows through a part of the tubes 114 in the one direction and then through the remaining part of the tubes 114 in the other direction. The two heat exchanger arrangements and, eventually, the burning chamber arrangement are contained in a housing common to the whole unit, wherein between the wall of this housing 117 and the walls of the casing of the heat exchanger arrangements there is provided an air gap 118. The blower allotted to the exhaust air is accomodated in the area in which there is the smallest possible temperature, i.e., the temperature of the circulating air, this temperature being constant. The blower operates with the same working rhythm, at least as far as the temperature is concerned, and the combustion chamber is now capable due of its round shape to taking up even high air pressures or forces. In order to raise further the elasticity of the whole structure the connecting channels, the collecting channel 104 and the exhaust gas channel 106 consist each of two sockets 105a, 105b or 106a, 106b affixed, respectively, to the parts to be interconnected which sockets are movably interconnected by compensating tube sections 105c, 106c which allow relative movements of the two sockets with respect to one another in axial and/or radial direction, for example, by being constructed in the manner of concertina walls. The arrangement may be also such as with the embodiment shown in the drawing that the connection may consist of two frustoconical portions (or portions having the shape of a truncated care) with flexible movable walls the approximately equal base faces of which face one another and are connected with one another. The by-pass arrangement contains also a tubing which has a flexible elastic section 120, for example, in the shape of a concertina wall construction or of a compensator. This also contributes to making the whole arrangement elastic. The distributing channels and cross channels taper from one end to the other end, for example, by having an approximately triangular cross section, as shown at 121, 22, whereby the outer walls of the distributing channels or cross channels bay be removable or able to be screwed off in order to make the turbulence producing elements 123 within the tubings accessible. These turbulence producing elements are spiral-like, they consist of strips twisted on themselves, for example, around their longitudinal axis. In order to have a more favorable deflection of the respective air flow, for example of 90° or 180°, and in order to have a better distribution of the flowing mass over the width of the respective channel, there may be also provided deflecting blades 125 arranged parallelly to one another and in series such as to be interspaced along a common axis, said blades 125 being arranged side by side fo form a blade grid or blading unit.

In FIG. 9 there is shown another plant of the kind here in question which contains, too, a blower, a combustion chamber 120 and a first heat exchanger arrangement 121 and, further, a second heat exchanger arrangement 122, 123. Between these two heat exchanger arrangements there is provided a by-pass arrangement. Additionally, in the heat exchanging tube of the heat exchanger arrangement allotted to the circulating air a second tube is provided, wherein the hot exhaust gas is passed through the space between the two tubes so that it transmits on the one hand heat to the circulating air and on the other hand heat to the inner tube containing the exhaust air to be heated, whereby in this manner a very compact heat exchanger is obtained.

Figure 10:
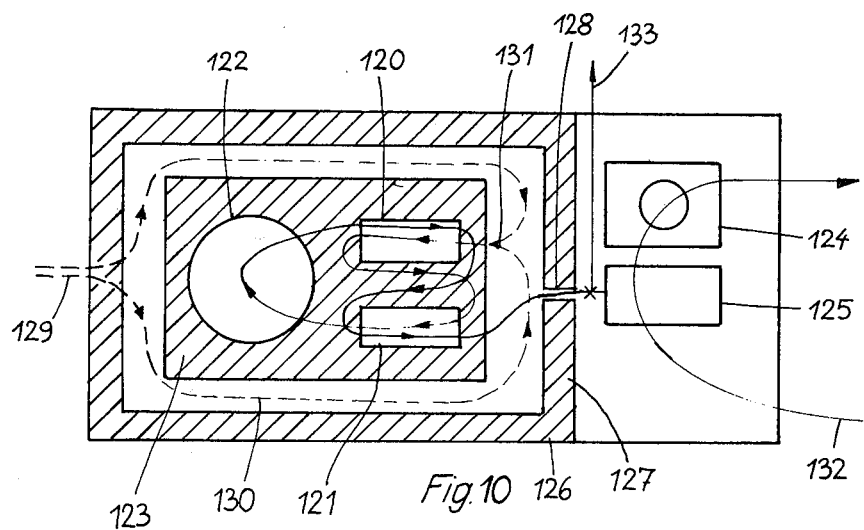
FIGS. 10 to 14 show schematically different variants of the plant according to the invention.
Figure 11:
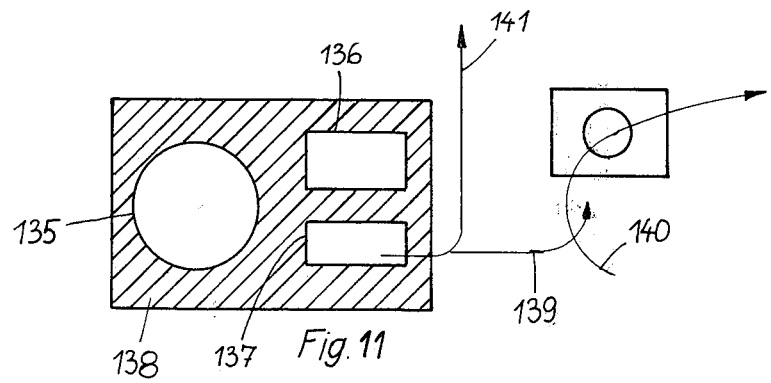
Figure 12:
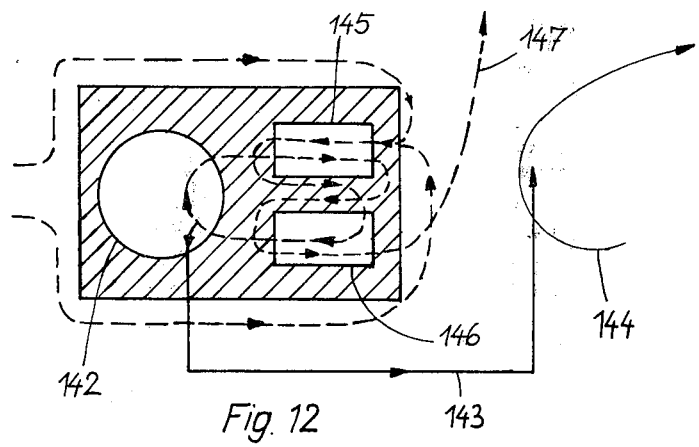

With the embodiments according to FIG. 10, 11 and 12 the device consists of a thermal afterburning plant allotted only and exclusively to the exhaust air and of a part allotted to the circulating air. The thermal afterburning plant thereby consists of a heat exchanger arrangement and of a burning chamber arrangement assembled with this heat exchanger arrangement to form a unit within an insulating inner casing, wherein the heat exchanger arrangement is situated before the burning chamber arrangement as seen in the direction of flow. The part allotted to the circulating air is connected on the one hand with the unit allotted to the exhaust air and is passed through on the other hand by the circulating air.

With the arrangement according to FIG. 10 the heat exchanger element consists of two individual heat exchangers 121, 122 following one another as seen in the direction of flow, the burning chamber arrangement is shown at 120. These parts are received by an insulated casing 123. The individual heat exchangers 121, 122 following one another in series are passed through on the one hand by the exhaust air coming from the industrial working plant and on the other hand by the exhaust air coming from the burning chamber arrangement. The part allotted to the circulating air consists of the blower portion 124 and of the heat exchanger portion 125 and it is constructed as a unit per se. Both parts — afterburning plant and part allotted to the circulating air — are accomodated within a common outer housing 126, they are separated wherein by means of the partition wall 127 which has an opening 128 through which the exhaust air or a part of the exhaust air may flow from the thermal afterburning plant to the part allotted to the circulating air. The exhaust air enters according to arrow 129 into the housing 126, flows at first through the gap 130 between the outer housing 126 and the casing 123 allotted to the afterburning plant, whereby it flows around the afterburning plant as a whole. Afterwards the air enters according to the arrows 131 into the heat exchanger arrangement in order to flow from there into the burning chamber arrangement 120. From the burning chamber arrangement the exhaust air flows again through the heat exchanger arrangement wherein it flows through this heat exchanger arrangement in the opposite direction as counter current or cross current in direction contrary to the just arriving air and heats up this latter named air, whereupon the exhaust air enters through opening 128 into the part allotted to the circulating air, wherein a part of this exhaust air is passed through the heat exchanger arrangement 125 in order to heat up the circulating air flow 132 flowing to the respective part. Another part of the exhaust air issues according to arrow 133, for example, through the chimney. With the arrangement according to the invention the exhaust air coming from the circulating air circuit flow first cools the whole plant in such a way that there is obtained on the one hand an especially favorable consumption of energy and on the other hand an especially good possibility for regulating the heat transfer. Moreover, an uncontrolled heat transfer, such as cannot be avoided with other afterburning plants, is substantially prevented: Consequently, the walls of the casing are no longer under so high a thermal stress and this brings about a lowering of the production costs and a simplification of the construction and a reduction of the heat exchanging surface. The inner insulation, i.e., the insulation of the casing 123, may be simple and inexpensive, it can be a simple insulation covered by a plain sheet metal envelope. The gap between the casing 123 and the outer housing 126 may be small since now only the exhaust air, the amount of which is substantially smaller than that of the circulating air, must be passed therethrough.

Figure 13:
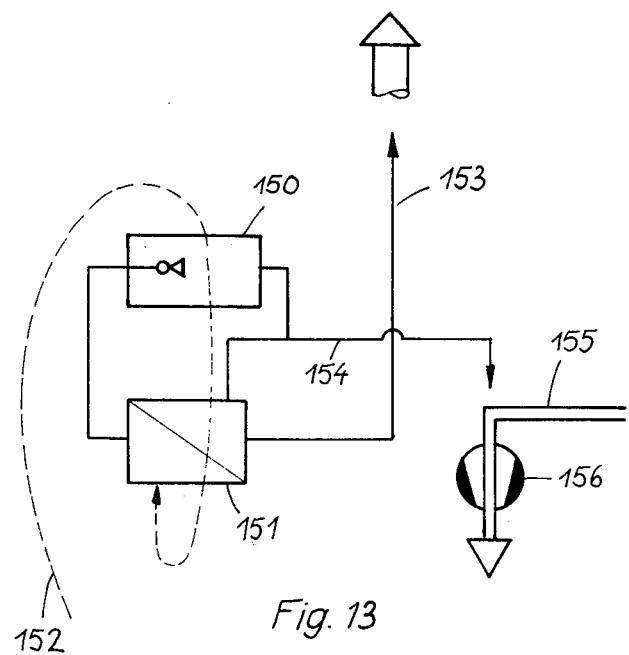
Figure 14:
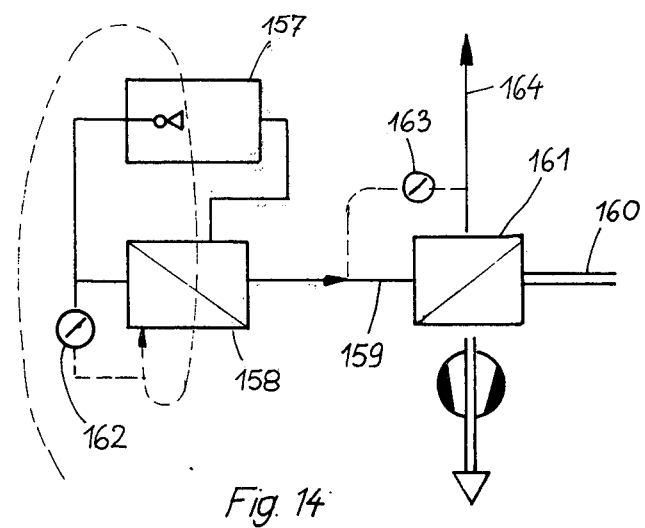

With the arrangement according to FIG. 11 the exhaust air is again passed first through the inner casing 138 of the afterburning plant which contains the burning chamber arrangement 135 and the two individual heat exchangers 136, 137 and which is insulated in a simple and cheap manner, said inner casing 138 being enclosed by an outer casing not shown in the drawing, wherein between these two casings there is provided again a gap. In this case, however, a part of the exhaust air is branched off after leaving the afterburning plant and introduced via 139 into the circulating air circuit flow 140, whereas the other part of the exhaust air leaves via 141 the plant through the chimney. With the arrangement according to FIG. 12 a part of the exhaust air is introduced into the circulating airflow 144 already after leaving the burning chamber arrangement 142 via 143, whereas the remaining part of the exhaust air is passed through the heat exchanger arrangement 145, 146 and is introduced thereafter via 147 into the chimney. With this solution, the temperature of the return flow 143 is as high as possible and the amount of the return flow is small so that the underpressure in the industrial working plant is not so intensively influenced by the return flow and, therefore, there is not necessary to suck out from the industrial working plant too much air. In FIG. 13 it is shown schematically again a burning chamber arrangement 150; 151 is the heat exchanger arrangement; the incoming exhaust air flows around the afterburning plant 150, 151 along the path 152. The outer casing is not shown. The exhaust air flows around the afterburning plant, enters into the heat exchanger arrangement 151, from there it flows into the burning chamber arrangement 150, then it flows again into the heat exchanger arrangement, whereupon the exhaust air is passed according to 153 into the chimney, unless a small portion is branched off according to 154 in order to be introduced into the circulating air circuit flow 155 to which there is allotted a conveying blower 156. In FIG. 14 there is shown again a burning chamber arrangement 157 and a heat exchanger arrangement 158, however, in this case the exhaust air is not introduced behind the heat exchanger arrangement directly into the circulating air circuit flow 160 according to 159, but it is introduced indirectly thereinto via the heat exchanger 161. The heat exchanger arrangement 158 may be eventually by-passed by means of the by-pass 162; the by-pass 163 serves to by-pass the heat exchanger allotted to the circualting air circuit flow. The circulating air enters at 164 into the chimney.

Figure 15:
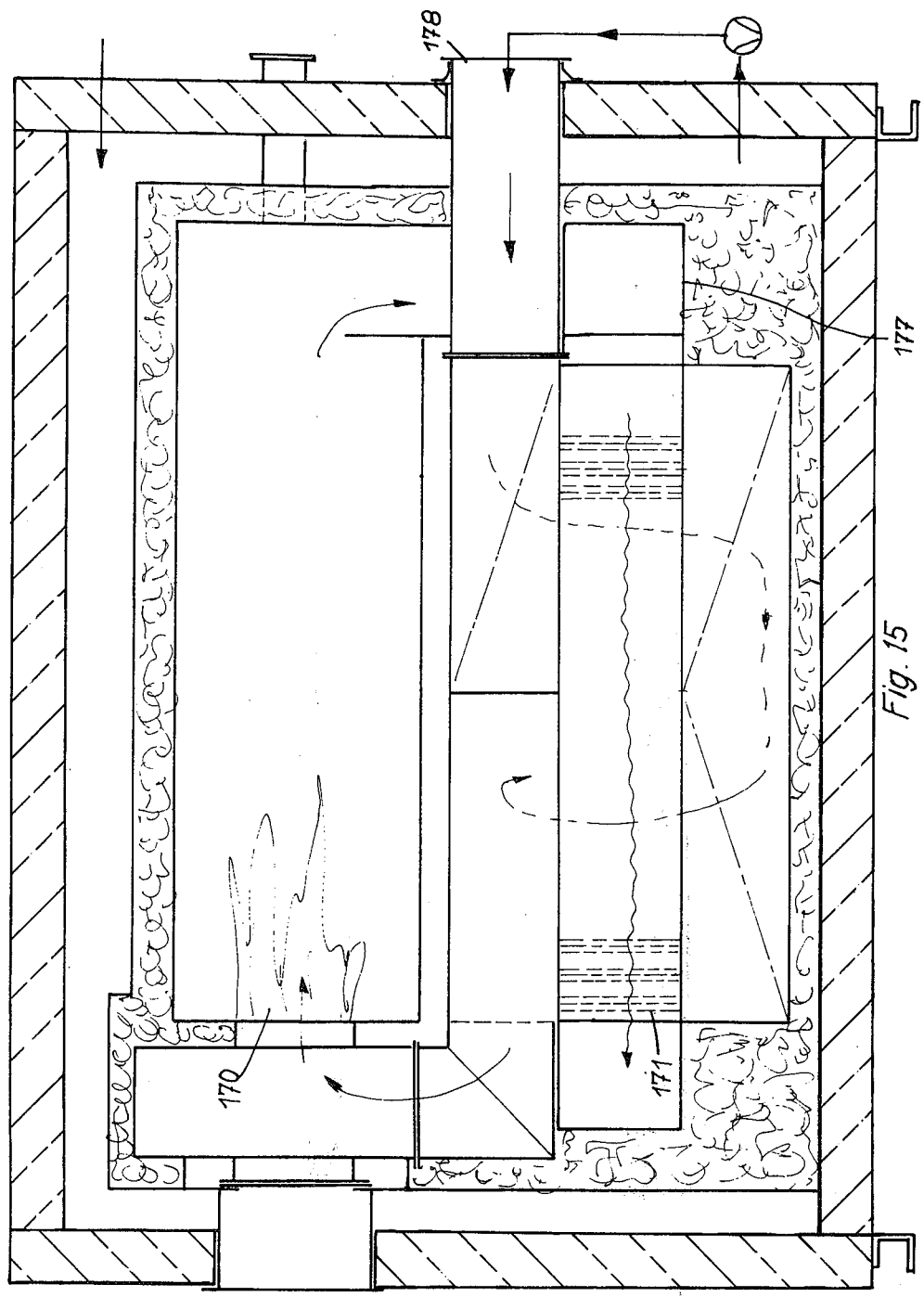
FIGS. 15 to 21 show schematically different practical embodiments of the variants shown in FIGS. 10 to 14 in different views and FIG. 22 is a further modified embodiment of the invention in a schematical representation.
Figure 16:
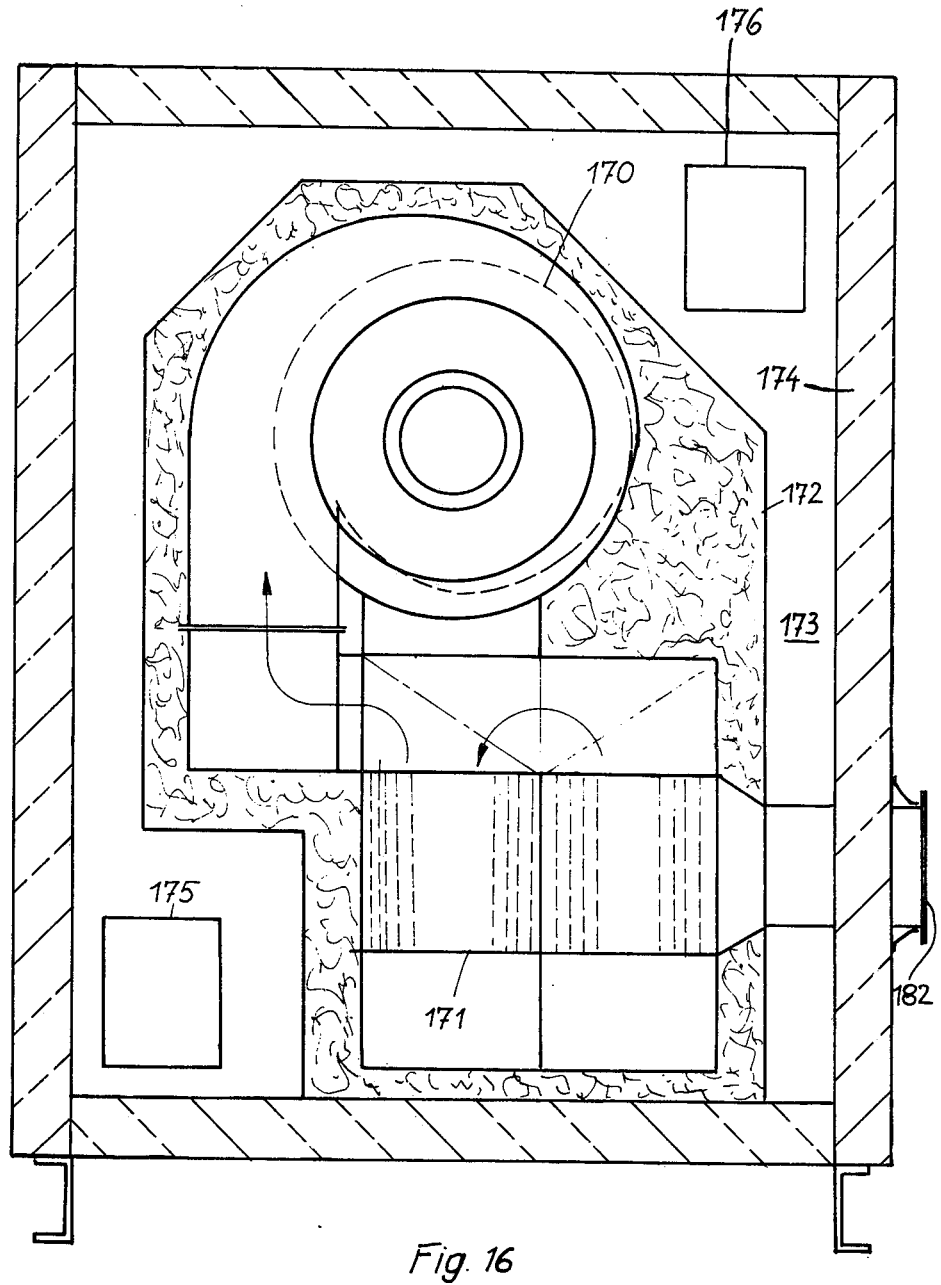
Figure 17:
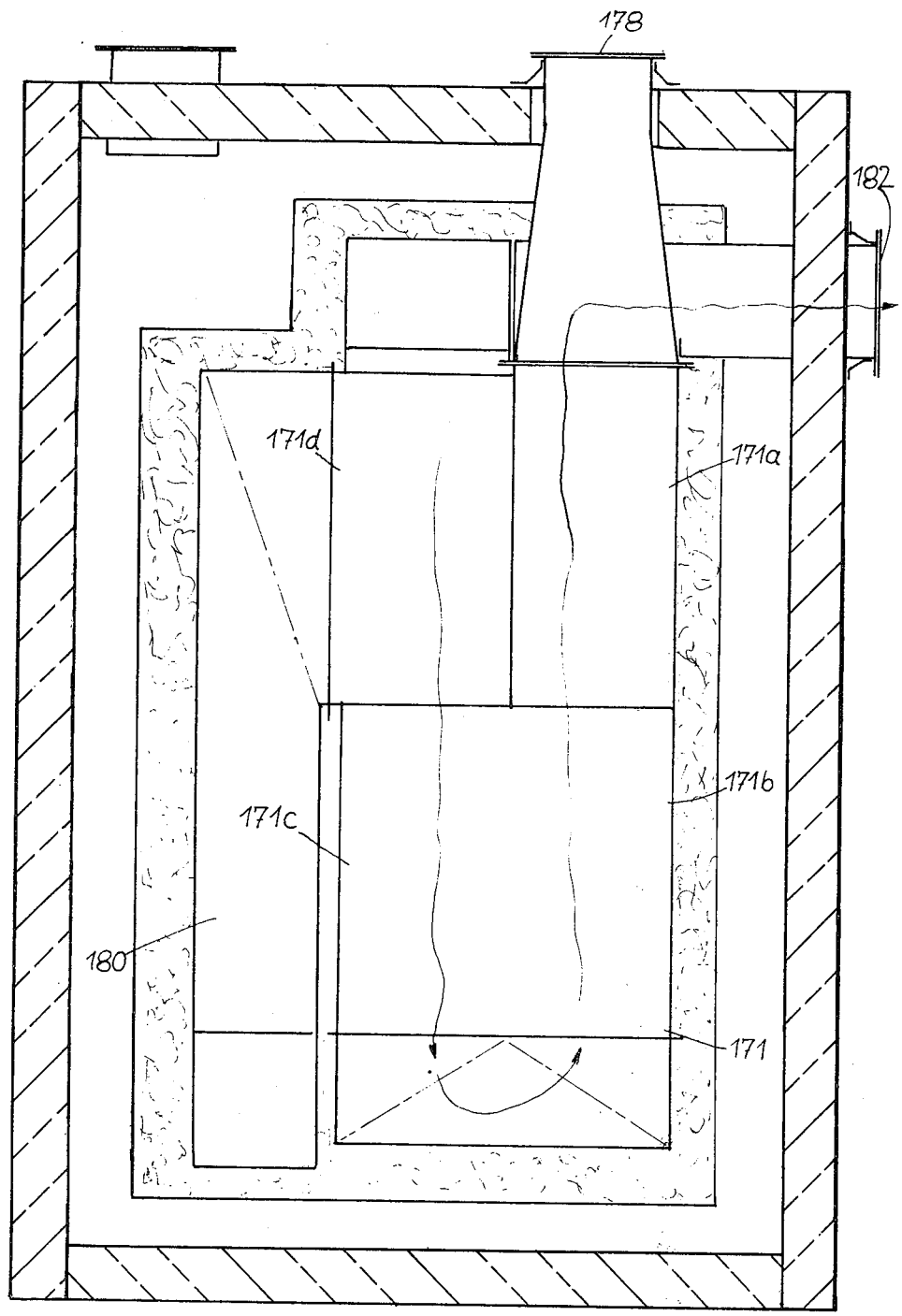

In FIG. 15, 16 and 17 there is shown a practical embodiment of the above described principles. 170 is the burning chamber arrangement, 171 the heat exchanger arrangement of the afterburning plant, 172 is the cheaply insulated casing allotted to the after burning plant, 173 is the gap between this casing and the outer housing 174. The exhaust air enters through the inlet 175, it is uniformly distributed in the gap and space 173 and is then sucked out through the outlet 176 in order to be thereafter sucked in by means of the blower 177 and through the opening 178 into the afterburning plant proper. The exhaust air flows then through the heat exchanger 171 at 171a, from there upwards towards 171b, from there again downwards to 171c and then upwards to 171d in order to be received then in the collecting channel 180 and to flow therefrom via a spiral conduit into the burner 170. From the combustion chamber the heated up exhaust air flows past the tube of the heat exchanger and transversely thereto and then it leaves through the opening 182 in order to be supplied thereafter to the circulating air circuit flow in the above described manner.

Figure 18:
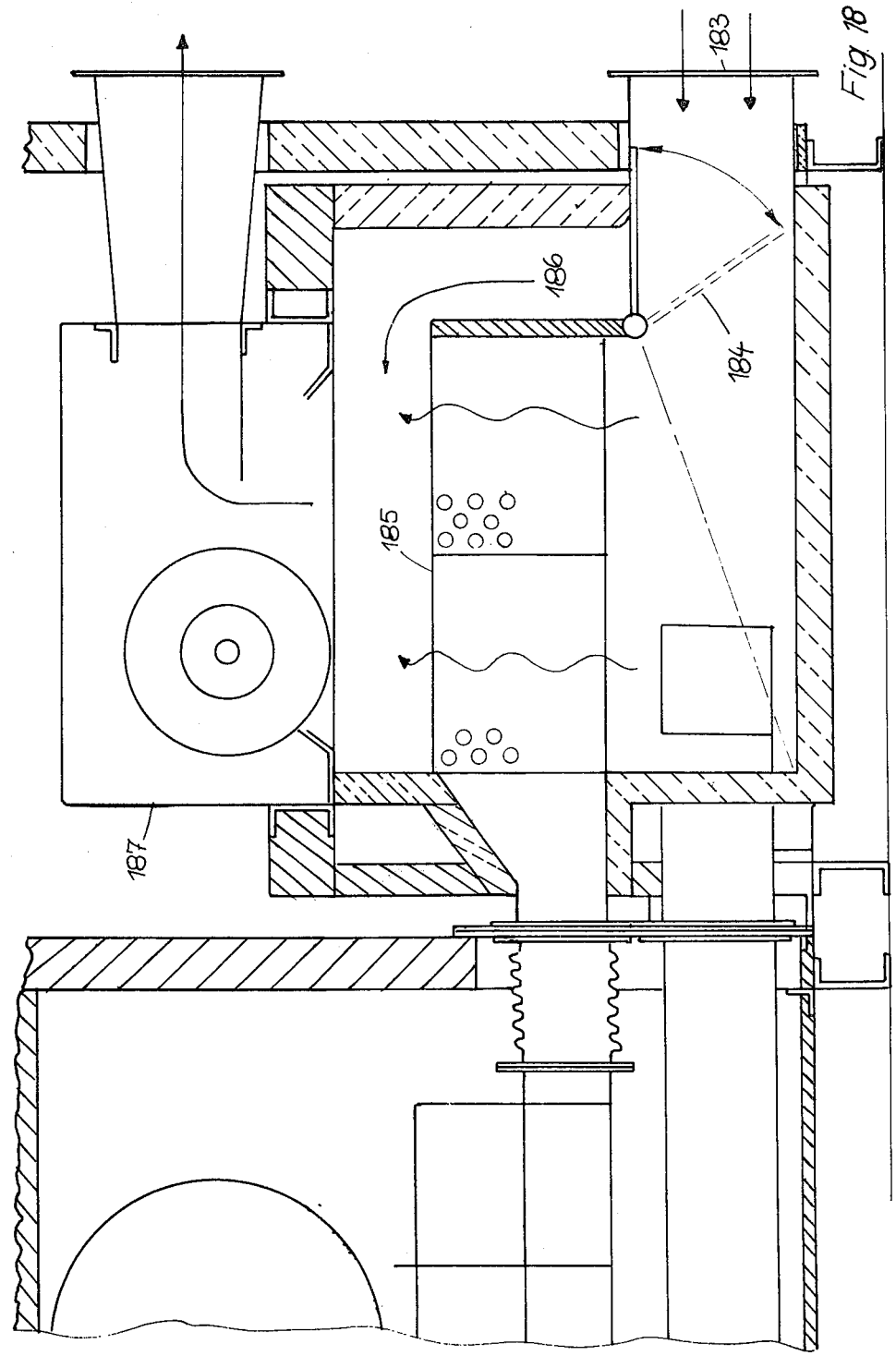
Figure 19:
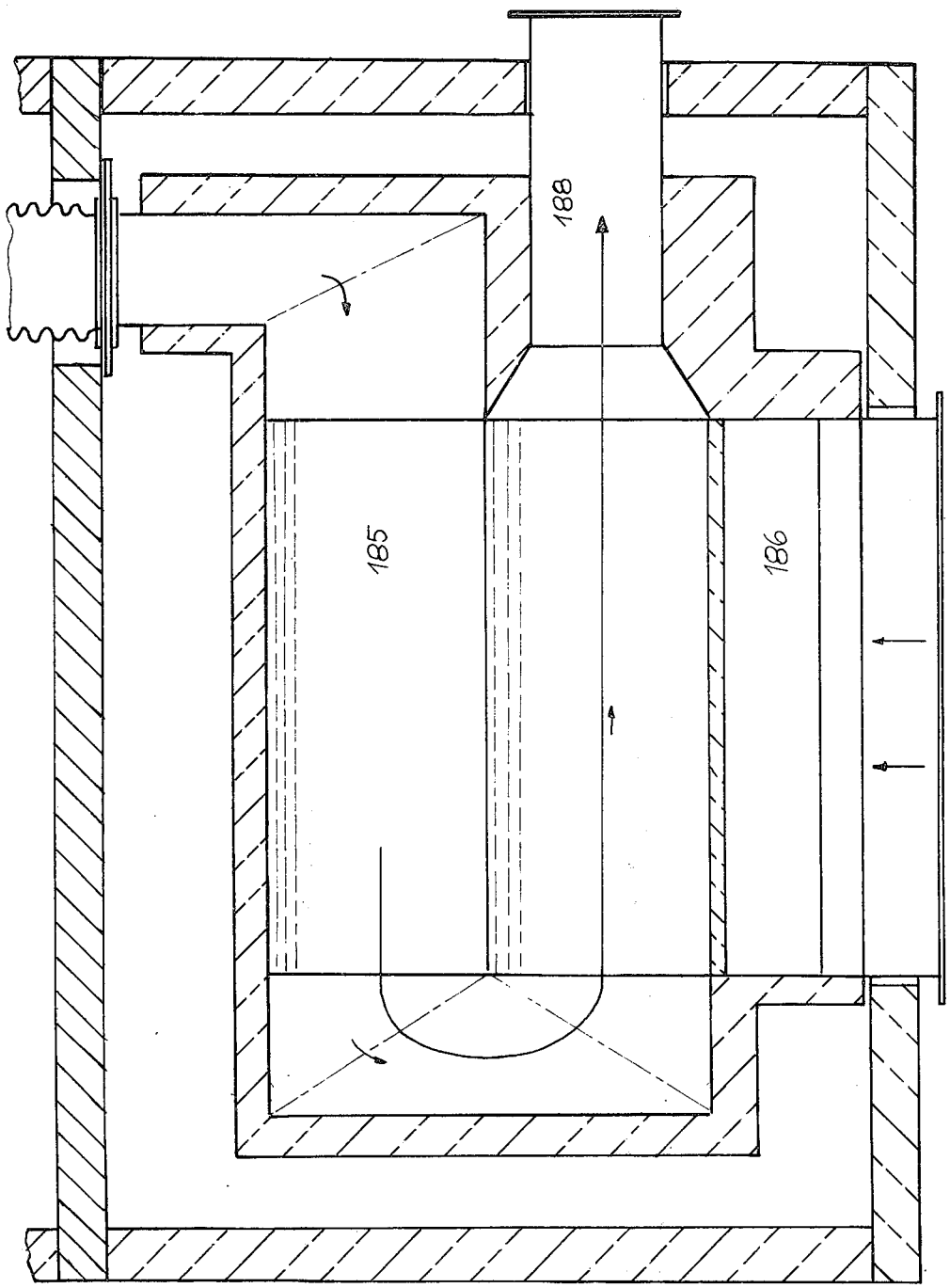

In FIGS. 18 and 19 there is shown the part allotted to the circulating air, FIG. 18 is a vertical section through this part, FIG. 19 is a horizontal section. The exhaust air which comes from the afterburning plant enters through the opening 183 which corresponds to the opening 182 in FIG. 15 to 17 and has now the possibility in dependence of the position of the by-pass flap 184 of flowing either through the heat exchanger 185 or past this exchanger at 186; 187 is the conveying blower. After having passed through or past the heat exchanger arrangement 185, the hot exhaust gas flow at 188 into the chimney.

Figure 20:
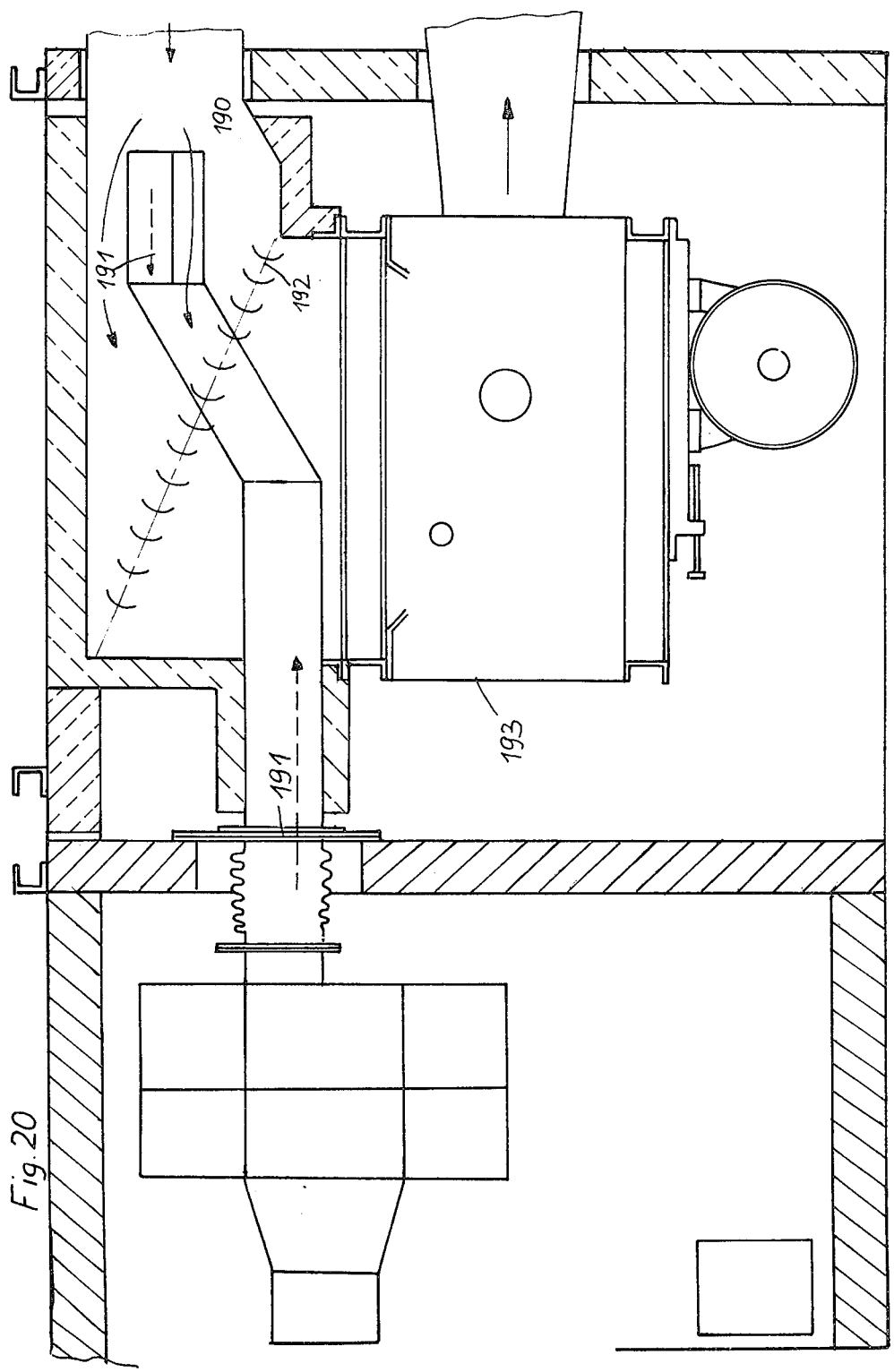
Figure 21:
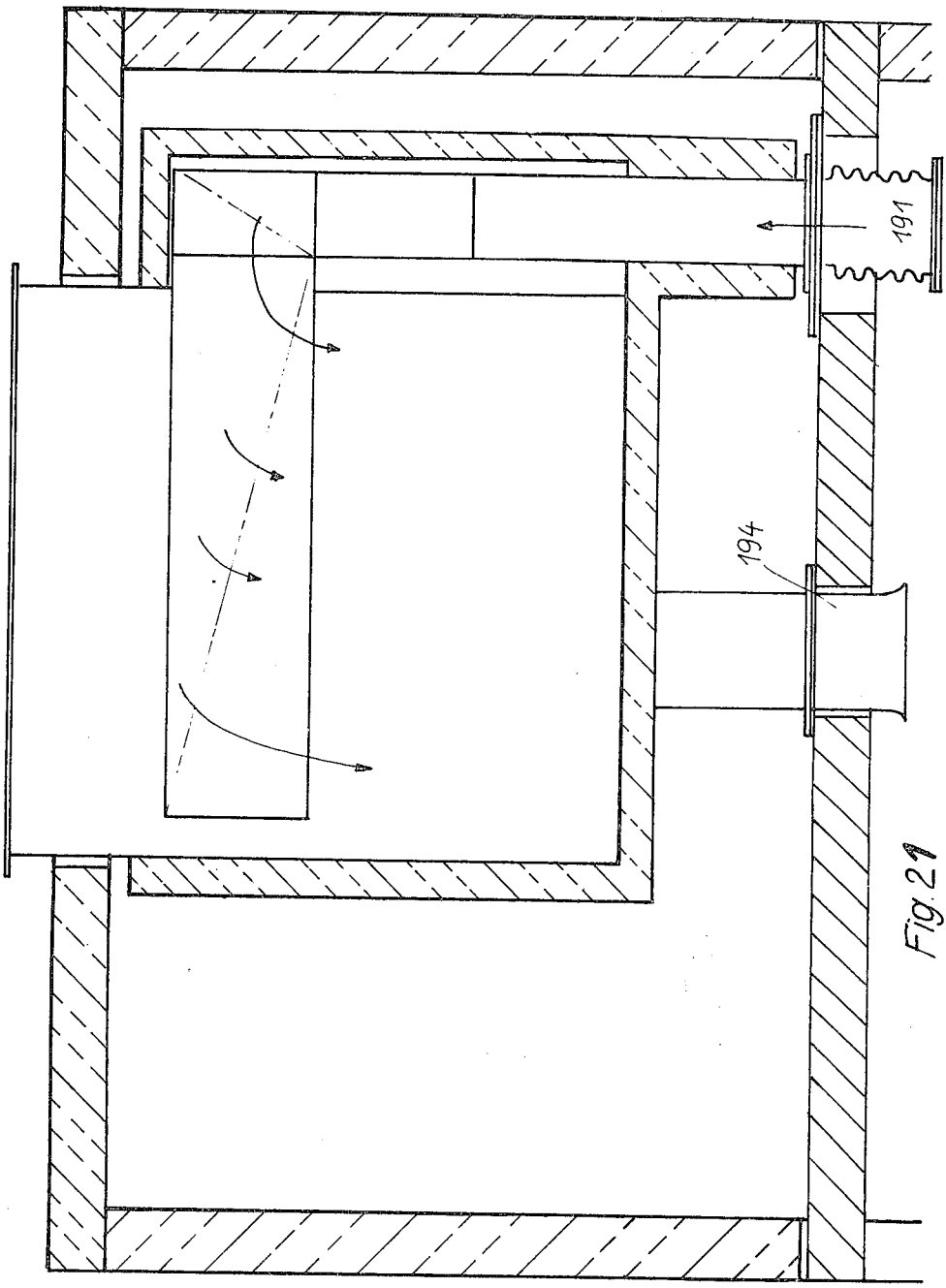

In FIGS. 20, 21 there is shown a direct heat return. The air is let in at 190, passes along the inlet channel 191 which contains lateral openings to which the hot exhaust gases are sucked in from the afterburning plant directly into the circulating air circuit flow 190, then it flows via the blading 192 directly into the blower 193 allotted to the circulating air and from there again into the industrial working plant via 194.

Figure 22:
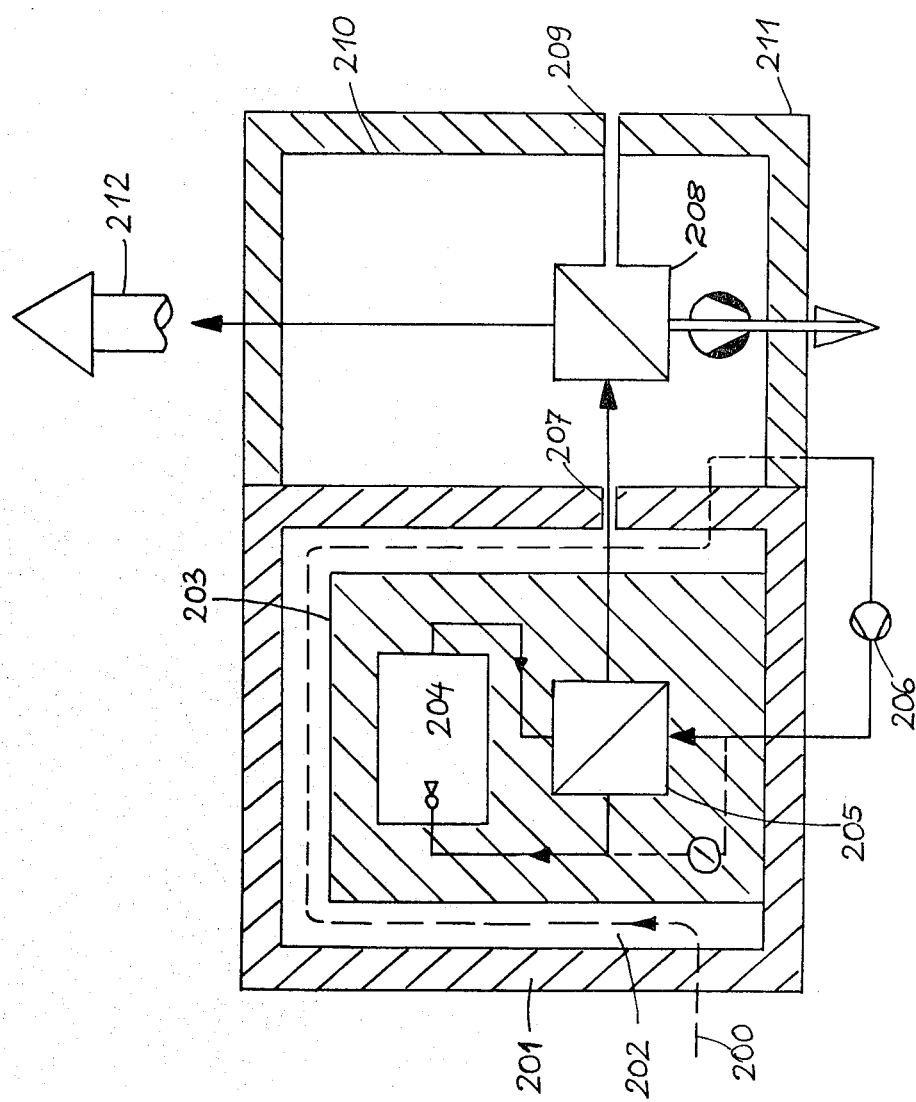

In FIG. 22 the exhaust air enters at 200 into the outer casing 201, i.e., into the gap 202, it flows around the thermal afterburning plant 203 with the burning chamber arrangement 204 and the heat exchanger arrangement 205, it enters then, assisted by the blower 206, into the heat exchanger arrangement, from there it flows into the burning chamber arrangement and from there again into the heat exchanger arrangement in order to enter thereafter through the opening 207 into heat exchanger arrangement 208 of the circulating air circuit flow 209 within part 210. The whole arrangement is enclosed by the outer casing 211 and assembled to form a unit. 212 is the chimney.

The invention described in connection with the different above shown embodiments starts form the understanding that a higher gradient of temperature may be obtained in the area of the combustion chamber by preheating the exhaust air not so intensively so that for the same amount of exhaust air there is necessary a substantially greater flame surface which results in a substantially greater concentration of radicals which greatly influence the combustion process so that, as a consequence, a better combustion is obtained. Therefore, advantages of the invention are smaller heat exchangers, less expenditure for the afterburning operation, a better combustion in the smallest possible combustion chamber and a longer service life of the metals and of the insulation.

For clarity's sake it shall be pointed out here again that in the arrangements here in question there are three flow circuits, namely that of the circulating air which passes through the industrial working plant and which flows within a circulating air circuit flow, then that of the exhaust air derived from the circulating air circuit flow and flowing to the burning chamber arrangement and finally that of the exhaust air coming from the burning chamber arrangement which may be also designated as exhaust gas or exhaust gas flow.

What I claim is:

1. A method for heating a recirculating gas flow in an industrial process and for burning combustible matter in said gas including
   a. recirculating said gas in a substantially closed circuit;
   b. withdrawing a portion of said recirculating gas flow from said closed circuit;
   c. delivering said withdrawn portion to a combustion zone;
   d. supplying fuel to said combustion zone and burning the combustibles of said withdrawn portion therein;
   e. passing combustion gases from said combustion zone in heat exchange relation with at least a part of the withdrawn portion enroute to said combustion zone;
   f. transferring heat from said combustion gases to said recirculating gas in said closed circuit, said transfer of heat from said combustion zone comprising the sole source of heat supply to the recirculating gas in said closed circuit,
   g. and discharging to atmosphere a part of the withdrawn portion separate from said closed circuit and after burning of the combustibles therein.

2. In an industrial process plant having a chamber and a closed circuit of heated recirculating gas flow containing combustibles therein,
   a. means for heating said recirculating gas flow including
   b. a burner and
   c. a heat exchanger connected to receive combustion gases from said burner,
   d. means for withdrawing a portion of said recirculating gas flow from said closed circuit and delivering said withdrawn portion through said heat exchanger to said burner,
   e. means for supplying a fuel to said burner for burning with the combustibles in said withdrawn portion,
   f. means for conducting combustion gases from said burner to said heat exchanger,
   g. heat-delivering means for delivering heat from the combustion gases to said recirculating gas flow in said circuit, said burner and said heat-delivery means comprising the sole source of heat for said recirculating gas flow in said circuit, and
   h. means for discharging to the atmosphere a part of said withdrawn portion of recirculating gas flow while separate from said closed circuit and after passage thereof through said burner.

3. An industrial process plant according to claim 2 including means for providing indirect heat exchange between said burner and said closed circuit.

4. An industrial process plant according to claim 3, in which said delivery means includes means for delivering combustion gases to said recirculating gas flow.

5. An industrial process plant according to claim 3, in which said delivery means includes a circuit heat exchanger in said recirculating gas flow circuit and exposed to said combustion gases.

6. An industrial process plant according to claim 3, in which said delivery means includes an internal heat exchanger within said chamber and exposed to said combustion gases.

7. An industrial process plant according to claim 5, in which said circuit heat exchanger is connected to receive combustion gases from said heat exchanger.

8. An industrial process plant according to claim 7, including temperature control means including bypass means for bypassing a part of said withdrawn recirculating gas about said heat exchanger and directly to said burner.

9. An industrial process plant according to claim 8, including means for bypassing a part of said combustion gases about said circuit heat exchanger to said discharge means.

10. An industrial process plant according to claim 9, in which the burner is elongated and positioned transversely within said recirculating gas flow circuit, and including an elongate blower in said circuit and substantially co-extensive with said burner.

11. An industrial process plant according to claim 10, in which said burner, blower, heat exchanger and circuit heat exchanger are enclosed in a common insulating chamber.

12. An industrial process plant according to claim 11, in which said circuit heat exchanger is positioned within said heat exchanger within a common housing.

13. An industrial process plant according to claim 12 and including an expansion joint between said burner and said housing.

* * * * *